United States Patent
Kumar et al.

(10) Patent No.: US 11,080,356 B1
(45) Date of Patent: Aug. 3, 2021

(54) ENHANCING ONLINE REMOTE MEETING/TRAINING EXPERIENCE USING MACHINE LEARNING

(71) Applicant: International Business Machines Corporation, Armonk, NY (US)

(72) Inventors: Kapish Kumar, Bellandur (IN); Juilee A. Joshi, Ganeshmala (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/803,737

(22) Filed: Feb. 27, 2020

(51) Int. Cl.
*G06N 3/08* (2006.01)
*G06F 16/957* (2019.01)
*G06N 3/00* (2006.01)
*G06F 40/166* (2020.01)
*G06F 3/0485* (2013.01)
*G06F 3/0481* (2013.01)
*G06Q 10/10* (2012.01)

(52) U.S. Cl.
CPC ........ *G06F 16/9577* (2019.01); *G06F 3/0481* (2013.01); *G06F 3/04855* (2013.01); *G06F 40/166* (2020.01); *G06N 3/006* (2013.01); *G06N 3/08* (2013.01); *G06Q 10/10* (2013.01)

(58) Field of Classification Search
CPC .. G06F 3/0481; G06F 3/04855; G06F 40/166; G06N 3/08; G06Q 10/10
See application file for complete search history.

(56) References Cited

U.S. PATENT DOCUMENTS

| | | | |
|---|---|---|---|
| 5,764,901 A | 6/1998 | Skarbo et al. | |
| 7,248,231 B2 | 7/2007 | Hurley et al. | |
| 7,549,120 B1 * | 6/2009 | Griffith | G06Q 10/10 715/231 |
| 7,962,525 B2 | 6/2011 | Kansal | |

(Continued)

OTHER PUBLICATIONS

Kim, Jasmine, "Artificial Intelligence and Its Place in the Conference Room", retrieved on Jan. 27, 2020 from the Internet URL: https://www.lifesize.com/en/video-conferencing-blog/artificial-intelligence-in-the-conference-room (2018).

(Continued)

*Primary Examiner* — Dino Kujundzic
(74) *Attorney, Agent, or Firm* — Alexander G. Jochym; Jack V. Musgrove

(57) ABSTRACT

Real-time summarization of an online meeting is accomplished using a cognitive system that analyzes meeting content and generates a mini-presentation, i.e., a small number of slides that condense more extensive details. The summary allows an attendee to easily and quickly review portions of the meeting that were missed, while the meeting is still ongoing. The cognitive system can customize the summary for the attendee based on the attendee's role or information in the meeting content which has previously been presented to the attendee. A user interface has a special scrollbar divided into multiple sections corresponding to different topics of the summary. The presentation window can switch from current content to previous content when the attendee selects a particular section. A feedback mechanism may also be used to assist the presenter with future presentations, based on subjects raised in audience interaction that were topics of the meeting.

12 Claims, 5 Drawing Sheets

(56) References Cited

U.S. PATENT DOCUMENTS

| | | | |
|---|---|---|---|
| 8,806,380 B2* | 8/2014 | Moon | G06F 3/0482 |
| | | | 715/856 |
| 8,892,652 B2 | 11/2014 | Beerse et al. | |
| 8,922,617 B2* | 12/2014 | Alexandrov | H04N 7/155 |
| | | | 348/14.08 |
| 9,264,245 B2 | 2/2016 | Pasquero et al. | |
| 9,531,768 B2 | 12/2016 | Lu et al. | |
| 9,779,172 B2 | 10/2017 | Chang et al. | |
| 10,192,584 B1 | 1/2019 | Akolkar et al. | |
| 2002/0036694 A1* | 3/2002 | Merril | G11B 27/28 |
| | | | 348/220.1 |
| 2002/0112004 A1 | 8/2002 | Reid et al. | |
| 2007/0291667 A1 | 12/2007 | Huber et al. | |
| 2009/0046139 A1 | 2/2009 | Cutler et al. | |
| 2012/0166545 A1 | 6/2012 | Alexandrov et al. | |
| 2012/0166921 A1* | 6/2012 | Alexandrov | H04L 65/4015 |
| | | | 715/202 |
| 2012/0284640 A1* | 11/2012 | Sloyer | G06Q 10/10 |
| | | | 715/753 |
| 2013/0191452 A1 | 7/2013 | Beerse et al. | |
| 2013/0325972 A1 | 12/2013 | Boston et al. | |
| 2014/0208211 A1 | 7/2014 | Luo et al. | |
| 2015/0142800 A1* | 5/2015 | Thapliyal | G06F 16/345 |
| | | | 707/737 |
| 2016/0011729 A1* | 1/2016 | Flores | G06F 3/167 |
| | | | 715/728 |
| 2016/0170967 A1* | 6/2016 | Allen | G10L 25/63 |
| | | | 704/9 |
| 2016/0255127 A1 | 9/2016 | Baribault et al. | |
| 2017/0064254 A1* | 3/2017 | Mueller | G11B 27/034 |
| 2017/0131850 A1 | 5/2017 | Aggarwal et al. | |
| 2018/0077099 A1* | 3/2018 | Silva | H04L 12/1831 |
| 2018/0153458 A1 | 6/2018 | Desjardins | |
| 2019/0179892 A1* | 6/2019 | Chen | G06F 16/483 |
| 2020/0090659 A1* | 3/2020 | Castelli | G06F 16/48 |
| 2020/0273453 A1* | 8/2020 | Mody | G10L 15/22 |
| 2020/0311122 A1* | 10/2020 | Ramamurthy | G06N 20/20 |
| 2020/0374146 A1* | 11/2020 | Chhabra | G06Q 10/101 |
| 2020/0403818 A1* | 12/2020 | Daredia | G10L 15/22 |
| 2020/0409519 A1* | 12/2020 | Faulkner | H04N 21/4312 |

OTHER PUBLICATIONS

King, Hope, "How this guy used Watson to tune out of conference calls" [online], retrieved on Jan. 27, 2020 from the Internet URL: http://money.cnn.com/2016/05/19/technology/watson-conference-call/index.html (2016).

Luthra, Varun, et al., "A Machine Learning based Approach to Video Summarization" [online], retrieved on Jan. 27, 2020 from the Internet URL: https://www.cse.iitb.ac.in/~sharat/icvgip.org/ncvpripg2008/papers/24.pdf (2008).

* cited by examiner

ENHANCING ONLINE REMOTE MEETING/TRAINING EXPERIENCE USING MACHINE LEARNING

BACKGROUND OF THE INVENTION

Field of the Invention

The present invention generally relates to electronic collaboration, and more particularly to a method of providing an improved presentation experience to attendees of an online meeting.

Description of the Related Art

Advancements in a wide variety of technologies have led to an explosion in the use of remote collaborative meetings. These advancements include improvements in recording and viewing technologies like smartphones which enable nearly anyone to become a presenter or attendee, as well as enhanced distribution channels such as the Internet, Wi-Fi, and other networking systems.

A collaborative meeting occurs when a group of individuals of varying skills, expertise and responsibilities come together to work toward a common goal. Collaborative meetings can be loosely structured, or can use special collaborative software (sometimes referred to as groupware) to connect people at remote locations in a way that allows not only presentation by the group leader but also interactive communications such as allowing an attendee to post written questions to the presenter or verbally ask questions using an integrated voice chat system. Collaborative programs can incorporate other types of presentation software or similar tools which provide for the creation of electronic slides that can convey a variety of information like tables, charts, spreadsheets and video productions. While such presentations are particularly useful in the business world, they can be employed for other purposes including any type of non-business organization or even for private purposes among a group of friends.

SUMMARY OF THE INVENTION

The present invention in at least one embodiment is generally directed to a method of enhancing an online meeting between a presenter and an attendee who is remote from the presenter by accumulating meeting content provided by the presenter to the attendee over a network, analyzing the meeting content in real-time during the online meeting using a cognitive system to create a summary of the meeting content, receiving a request from the attendee to review the summary, and responsively providing the summary to the attendee over the network while the online meeting is ongoing. In an illustrative implementation, the meeting content is textualized, and the summary includes a plurality of electronic slides each having text generated by the cognitive system relating to a respective topic. The cognitive system can be trained using previous presentations provided to the attendee, so as to customize the summary for the attendee based on information in the meeting content which is also found in the previous presentations. Alternatively, or additionally, the cognitive system can be trained using multiple candidate roles, and the summary can be customized based on a role of the attendee. A collaborative meeting user interface can be provided which presents the meeting content to the attendee in a presentation window having a special scrollbar. The scrollbar is divided into multiple sections respectively corresponding to multiple topics of the summary. The presentation window can switch from display of current content to display of previous content in response to a selection by the attendee of a particular one of the sections of the scrollbar. A feedback mechanism may be used to assist the presenter with future presentations. Information pertaining to audience interaction with the presenter during the online meeting (such as attendee questions) is collected and analyzed to identify a subject of the audience interaction that is also a topic of the meeting content, and that subject can be conveyed to the presenter.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
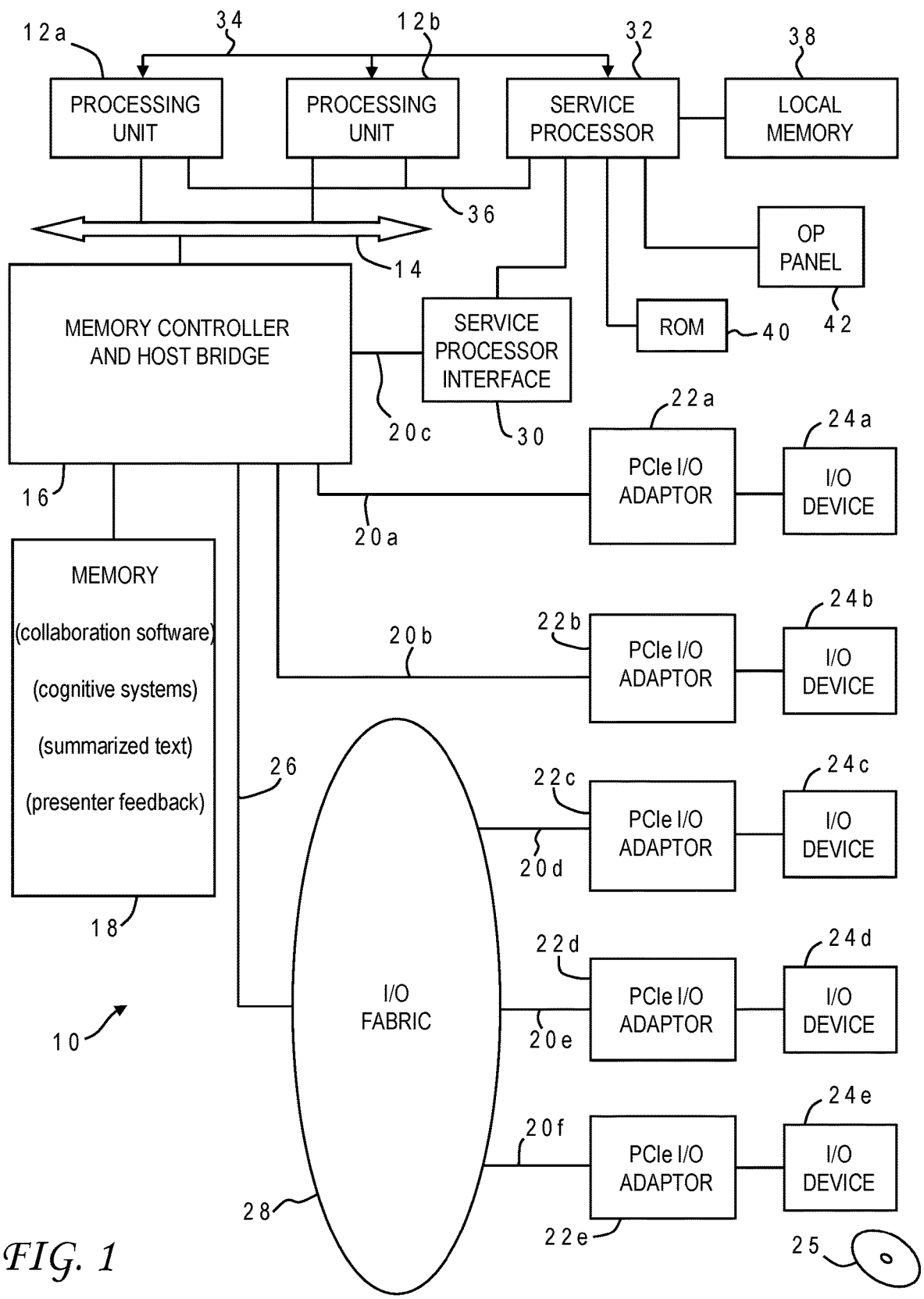
FIG. 1 is a block diagram of a computer system programmed to carry out real-time summarization of online presentations in accordance with one implementation of the present invention.

While modern collaborative software provides many benefits for remote meetings, there can still be numerous problems particularly for the attendees. Many of these problems stem from the fact that, at any given moment, attendees can only view the currently presented screen or slide, that is, they cannot view previously presented content. If an attendee has difficulty in understanding what the presenter is currently discussing and might want to view some earlier content, that content is not available without having to ask the presenter to go back in the presentation, inconveniencing the whole audience. This situation may arise for a variety of reasons. The attendee may have become distracted during the earlier part of the presentation, or may have entirely missed the earlier part. If the content is entirely new to most of the audience, they might want to review earlier parts. This can be troublesome when the attendee is asked a question for which the attendee does not have any appropriate reply. The attendee, and possibly other viewers, may not have any facility to understand what exactly the presenter is asking him.

It would, therefore, be desirable to devise an improved method for collaborative meetings which could allow an attendee to efficiently view previous presentation content. It would be further advantageous if the method could provide a customized summary of the content based on the particular attendee. These and other advantages are achieved in various embodiments of the present invention by using machine learning to generate summarized text for an ongoing meeting. The summarized text can itself be in the form of a mini-presentation with a very small number of slides or screens that allow a user to easily catch up on parts of a presentation the user may have missed. The improved collaboration software can also provide a novel user interface that allow an attendee to determine a context for a question that may be asked, and quickly move to relevant parts of the presentation.

Different aspects of the present invention can be facilitated using one or more cognitive systems, as explained in further detail below. A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feedforward neural network based on animal visual perception, and so is particularly useful in processing image data. Convolutional neural networks are similar to ordinary neural networks but are made up of neurons that have learnable weights and biases.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

A modern implementation of artificial intelligence is the IBM Watson™ (IBM and all IBM-based trademarks and logos are trademarks or registered trademarks of International Business Machines Corporation and/or its affiliates) cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

With reference now to the figures, and in particular with reference to FIG. 1, there is depicted one embodiment 10 of a computer system in which the present invention may be implemented to carry out real-time summarization of meeting content using machine learning. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, including collaboration software, one or more cognitive systems, summarized text, and a facility allowing feedback to a presenter after a meeting is over.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the collaborative meeting application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a collaborative meeting process that uses novel machine learning techniques to manage attendee viewing of meeting content. Accordingly, a program embodying the invention may additionally include conventional aspects of various collaborative meeting tools, as well as cognitive systems, and these details will become apparent to those skilled in the art upon reference to this disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Figure 2:
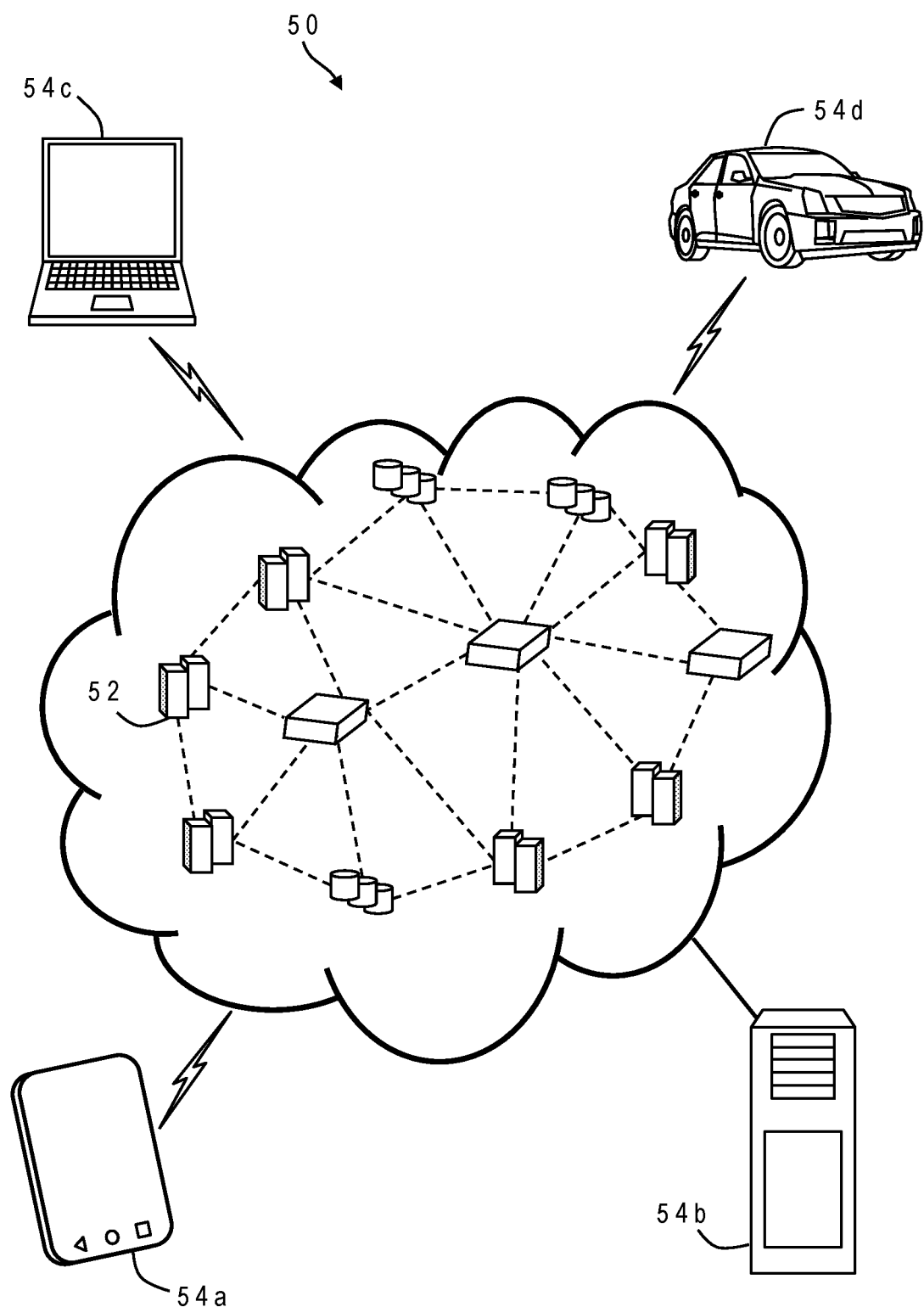
FIG. 2 is a pictorial representation of a cloud computing environment in accordance with one implementation of the present invention.

A cloud computing environment is service oriented with a focus on statelessness, low coupling, modularity, and semantic interoperability. At the heart of cloud computing is an infrastructure that includes a network of interconnected nodes. An illustrative cloud computing environment 50 is depicted in FIG. 2. As shown, cloud computing environment 50 includes one or more cloud computing nodes 52 with which local computing devices used by cloud consumers, such as, for example, personal digital assistant (PDA) or cellular telephone 54a, desktop computer 54b, laptop computer 54c, and/or automobile computer system 54d may communicate. Nodes 52 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54a-54d shown in FIG. 2 are intended to be illustrative only and that computing nodes 52 and cloud computing environment 50 can communicate with any type of computerized device over any type of network and/or network addressable connection (e.g., using a web browser). In the context of the present invention, any of the computing nodes or local computing devices may be used by a presenter of a collaborative meeting or an attendee thereof.

Figure 3:
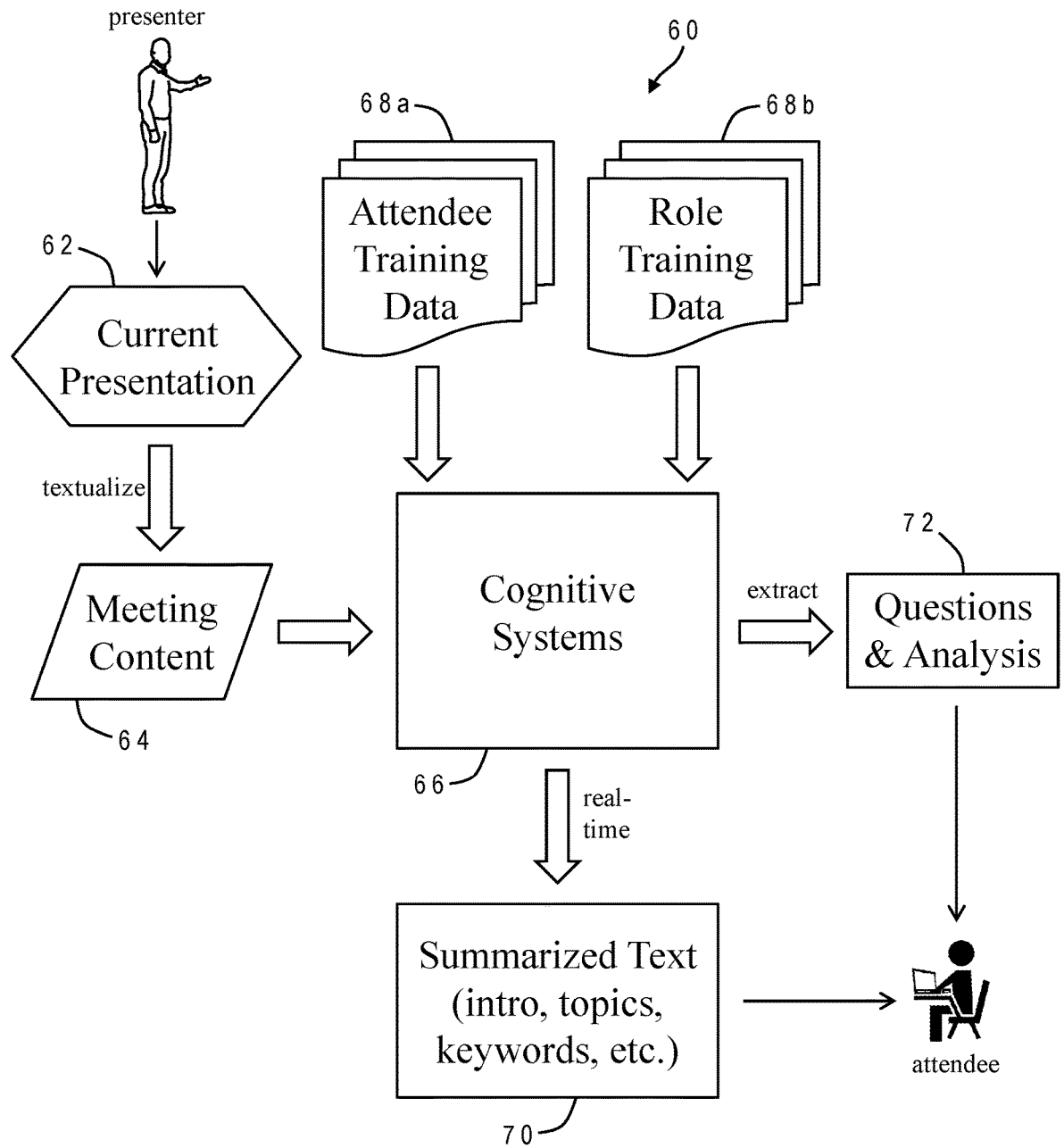
FIG. 3 is a pictorial representation of a cognitive system that takes textualized meeting content from a current presentation and generates summarized text in real-time in accordance with one implementation of the present invention.

Referring now to FIG. 3, there is depicted a high level example of a collaborative meeting system 60 in accordance with one implementation of the present invention. A speaker is presenting the current presentation 62 to remote attendees using collaborative software via a network such as that just described. The speaker may be the meeting host, or one of many different presenters for this meeting, possibly even another attendee. The presentation may include slides or other static media and video or audio recordings presented successively, as well as the speaker's verbal discussion. All of this information can be textualized using various conventional methods, that is, rendered into a format that is purely text, to provide meeting content 64 as an input to one or more cognitive systems 66 for summarization.

As noted above, the invention may utilize multiple, different cognitive systems. The cognitive systems may reside on a computing device such as computer system 10 of FIG. 1, and may be deployed at any location including a computer of a present or a computer of an attendee; in the illustrative implementation, the cognitive systems are provide via a cloud computing service, i.e., at one of the nodes 52 of FIG. 2. Each cognitive system 66 is trained with appropriate data based on its particular purpose and design. In some embodiments, a cognitive system provides a summary of ongoing meeting content based on the particular attendee requesting the summary. The cognitive system may take into consideration previous presentations viewed by the attendee so as to inform the cognitive system what topics or features may already be familiar with the attendee. Accordingly, first training data 68a may be information pertaining to such previous presentations. The past presentation information, rather than being actual content related to those presentations, can instead be provided in the form of a set of weights for a neural network or other machine learning system that is based on the actual presentations, e.g., associated with certain words or terms. In some embodiments, the cognitive system may alternatively or additionally provide a summary based on a particular role of the attendee. For example and without limitation, candidate roles may include sales, marketing, technical, accounting or executive positions. Accordingly, second training data 68b may be information pertaining to such roles. In this manner, the cognitive system(s) 66 can provide summarized text 70 that is customized for this particular attendee. This customization means that different summaries can be provided to different attendees.

It is a key feature of the present invention that the summary 70 is provided in real-time, that is, while the presentation is still ongoing, and can accordingly be updated periodically. The term "real-time" as used herein denotes the actual time during which the presentation being summarized occurs, with there being practically no delay. This real-time summary preferably has only the most relevant content, and other content which is irrelevant to the topic can be discarded. So the textualization can remove disruptions, breaks, silent spans, or network issues from the conference summary. Conventional machine learning techniques can be used to create the summarized text 70 from the textualized meeting content 64; see for example the video summarization methodology described in U.S. Pat. No. 10,192,584, and the paper "A Machine Learning based Approach to Video Summarization" by Luthra et al. These techniques allow system 60 to create summarized text 70 that identifies an introductory part of the speech, context switches during the conference between different topics, a user asking a particular question, etc., including the provision of keywords relevant to the discussion.

Take the situation where a user has missed the initial content because the user joined the online conference late. In such a case, it may be difficult for the user to grasp the currently presented content. Even if the user could view that content, it might take awhile to do that and then the user will once again miss portions of the ongoing presentation. With the present invention, system 60 will summarize the missed contents in a text format based on topics, keywords, etc., so that user may go to the missed content and see the summarized version in much less time, and thereby can become current with the live presentation quickly. The slides generated for the summary can be played at a speed which is faster than the normal speed of the presentation but still understandable by the viewer, who may then join the live conference promptly.

As an optional feature, some implementations of the present invention further use one of the cognitive systems to 68 to identify questions 72 in the meeting content, whether embedded in a slide of the presentation or being orally asked by the presenter or another attendee. The question is preferably extracted verbatim from the content although it can be paraphrased. Any given statement found in meeting content 64 can be examined to consider whether it is actually a question, and if a sufficiently high confidence of this is returned then the statement is provided to the user as a current question. The same cognitive system can generate a context or explanation regarding the question much in the same way that cognitive systems are used to answer natural language queries, such as with a search engine. Natural language processing (NLP) is a field of computer science, artificial intelligence, and linguistics that allows computers to derive meaning from human or natural language input, and to generate responses in a manner familiar to a user. NLP can also involve relationship extraction, i.e., detecting semantic relations within a set of artifacts, typically from text or XML documents and, in this case, material found in the meeting content. In this manner system 60 can provide insight as to the correct answer to an extracted question.

Figure 4:
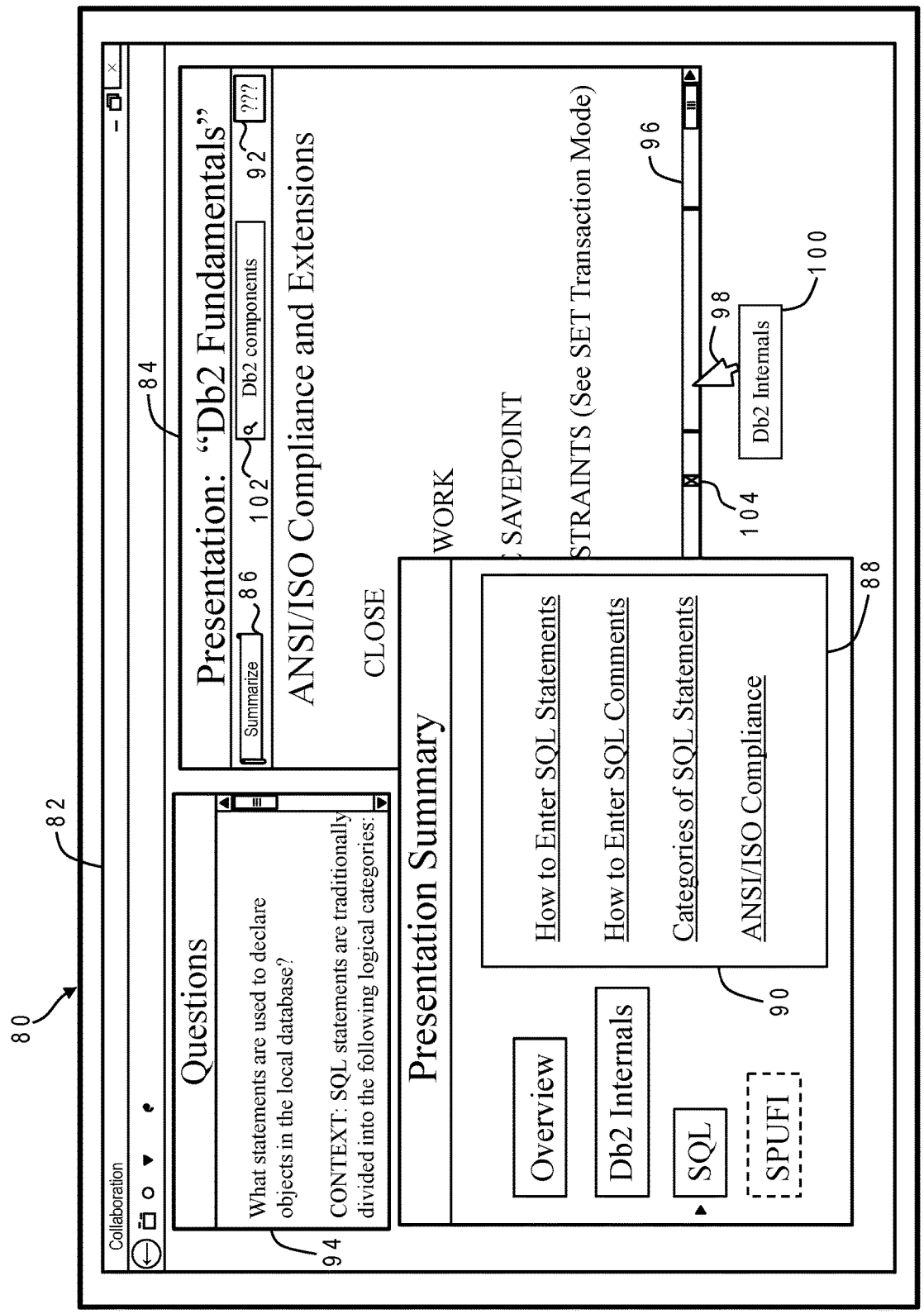
FIG. 4 is a screenshot of a user interface for collaboration software in accordance with one implementation of the present invention wherein a currently-generated summary of a presentation can be viewed while the presentation is ongoing.

FIG. 4 shows a working example for a live presentation on "Db2 Fundamentals" (Db2 is a family of data management products, including database servers, developed by International Business Machines Corporation). This example illustrates an attendee view of a display device 80 of a computer system used by the attendee (which may again be a system such as computer system 10 of FIG. 1), such as a liquid crystal display screen. Display device 80 has displayed thereon a primary or parent window 82 for the collaborative software being used for the meeting. That window may include a variety of standard features such as drop-down menus or icons that enable various functions. Within parent window 82 is seen a secondary or child window 84 showing the current presentation. Further to this example, the presentation has already gone over two general topics, an overview and Db2 internals, and FIG. 4 represents a point in time where the presentation is currently near the end of the third topic of SQL (SQL is a programming language used for managing data held in a relational database management system).

The attendee has just joined the presentation at this time and wishes to have a brief review of earlier content, and so activates a "Summarize" button 86 embedded in presentation window 84. Activation of button 86 causes the collaborative software to responsively generate another child window 88 containing a real-time text summary of the meeting content, provided by a cognitive system running in the cloud. The cognitive system can be running continuously in the background during the entire presentation so its summarization results can be provided immediately upon activation of button 86. The summarization feature may be built-in to the collaborative software or may be an add-on used only the attendee which interfaces with the collaboration software. In this example, the cognitive system has generated a total of three slides (so far) to summarize the previous meeting content and allow the attendee to grasp the live presentation in a very short time. Headers for those three slides are seen along the left side of summary window 88, "Overview", "Db2 Internals" and "SQL", and these slides are shown in temporal succession within a mini-presentation pane 90 of summary window 88. A small triangle adjacent one of the headers can act as a pointer to indicate which slide of the summary is currently being shown in pane 90. For the SQL part of the presentation, the cognitive system has condensed multiple slides on that topic into a single slide that includes four sub-topics, "How to Enter SQL Statements", "How to Enter SQL Comments", "Categories of SQL Statements" and "ANSI/ISO Compliance" (the latter of these sub-topics is the current focus of presentation as seen in presentation window 84). As an optional feature, the collaborative software can provide further viewing of details of these sub-topics by clicking on any of them, which can generate another child window (not shown) with those details. Thus, by reviewing the three slides of the mini-presentation in pane 90, the attendee can quickly catch up to the ongoing slide in presentation window 84.

According to this embodiment, presentation window 84 also has a questions button 92 labeled with three question marks "???" which can be activated to bring up another child window 94 allowing the attendee to see any question that may have currently or recently been extracted from the meeting content. In this example the question is "What statements are used to declare objects in the local database?". Questions window 94 provides a context for answering this question based upon related content extracted from the presentation, i.e., quoting passages of text from the content.

As previously discussed, the cognitive system summarizing the presentation is operating in real-time and can periodically update the summarized text. If the attendee should get called away and miss more of the presentation, the attendee can again click on the summarize button 86 to update the summary. This updating may add one or more slides to the mini-presentation performed in pane 90 as well as new headers, represented by the "SPUFI" (SQL processing using file input) header in a dashed box in FIG. 4. Clicking on the questions button 92 can likewise update questions window 94 with a more recent question, and corresponding answer.

Another feature of this embodiment seen in FIG. 4 is a smart scrollbar 96.

Smart scrollbar 96 provides a contextual seek function, forward and backward, which allows participants to jump to a particular part of the teleconference very quickly. Smart scrollbar 96 can work in conjunction with the summarization feature, dividing the scrollbar into sections that have labels corresponding to the different summarization headers. FIG. 4 illustrates a graphical pointer (mouse arrow) 98 hovering over one section of smart scrollbar 96 corresponding to the meeting content associated with the "Db2 Internals" header. A pop-up box 100 accordingly appears near graphical pointer 98 to show the user the context of that section. If the user clicks on this area of smart scrollbar 96, the collaborative software will bring up a previous slide from the presentation and display it in presentation window 84. It can optionally bring up any audio stream associated with that part of the presentation, temporarily overriding the current audio stream of the presentation. If the user thereafter clicks at the distal end of the scrollbar (the right end in FIG. 4 where the scroll box/thumb is seen), then presentation window 84 will switch back to the current content.

This feature is particularly advantageous in the situation where a user has been wanting to go back and review earlier content but has been waiting for an opportune time, such as when the current presentation moves to a topic that is already well-known to the user or of no interest. The user can choose the best time frame to go back and get more details of already covered topics. In this manner, the user has a powerful yet intuitive way to quickly navigate to a desired portion of the presentation, and selectively review only those parts desired. While smart scrollbar 96 is illustrated in a horizontal orientation at the bottom of presentation window 84, it can be provided in other fashions, e.g., vertically along the right side of the that window.

The collaborative software can provide yet another feature for keyword searching of the meeting content, which can interact with smart scrollbar 96. According to this embodiment, a search box 102 is provided along the top area of presentation window 84. When the user enters a keyword, such as "Db2 components", the system will search the meeting content for that keyword and pass the time frame of the content which needs to be played to view occurrences of the keyword. The relevant time frame(s) can be indicated by special highlighting of corresponding areas of the smart scrollbar such as colored lines or a block 104 within the scrollbar. Clicking on one of these lines or blocks will immediately begin playback of the prior portion of the presentation at the found location of the keyword. The keyword searching can apply to speech in the presentation which has been textualized, as well as any actual text comprising a part of the video presentation.

While the exemplary implementation seen in FIG. 4 provides separate child windows for each of the live feed, summary and questions, those skilled in the art will appreciate that only a single window could be provided with appropriate buttons allowing the user to switch between each of these interfaces. There could also be additional windows, for example, a first presentation window that shows a deck of slides and a second presentation window that shows a live feed of the presenter discussing the slides.

In some implementations, the present invention also contemplates a feedback mechanism to assist the presenter in improving their presentation content and presentation skills. This mechanism can collect information pertaining to audience interaction with the presenter, particularly regarding questions asked by the attendees, or subjects otherwise raised. A machine learning module (i.e., another cognitive system) can scan this information and map it to the presentation in a manner that identifies the more relevant feedback. The machine learning module can provide a set of scores for different subjects indicative of the need for further elucidation to the presenter, and the presenter can decide which subjects require more attention. Continuing with the example of FIG. 4, the module might assign a 65% feedback score for content pertaining to memory architecture of Db2, a 25% feedback score for content pertaining to data structures, and a 10% feedback score for content pertaining to filtering data. This feedback will inform the presenter that the memory architecture of Db2 needs further consideration, and thus helps the presenter improve on this topic to make future presentations more effective.

Figure 5:
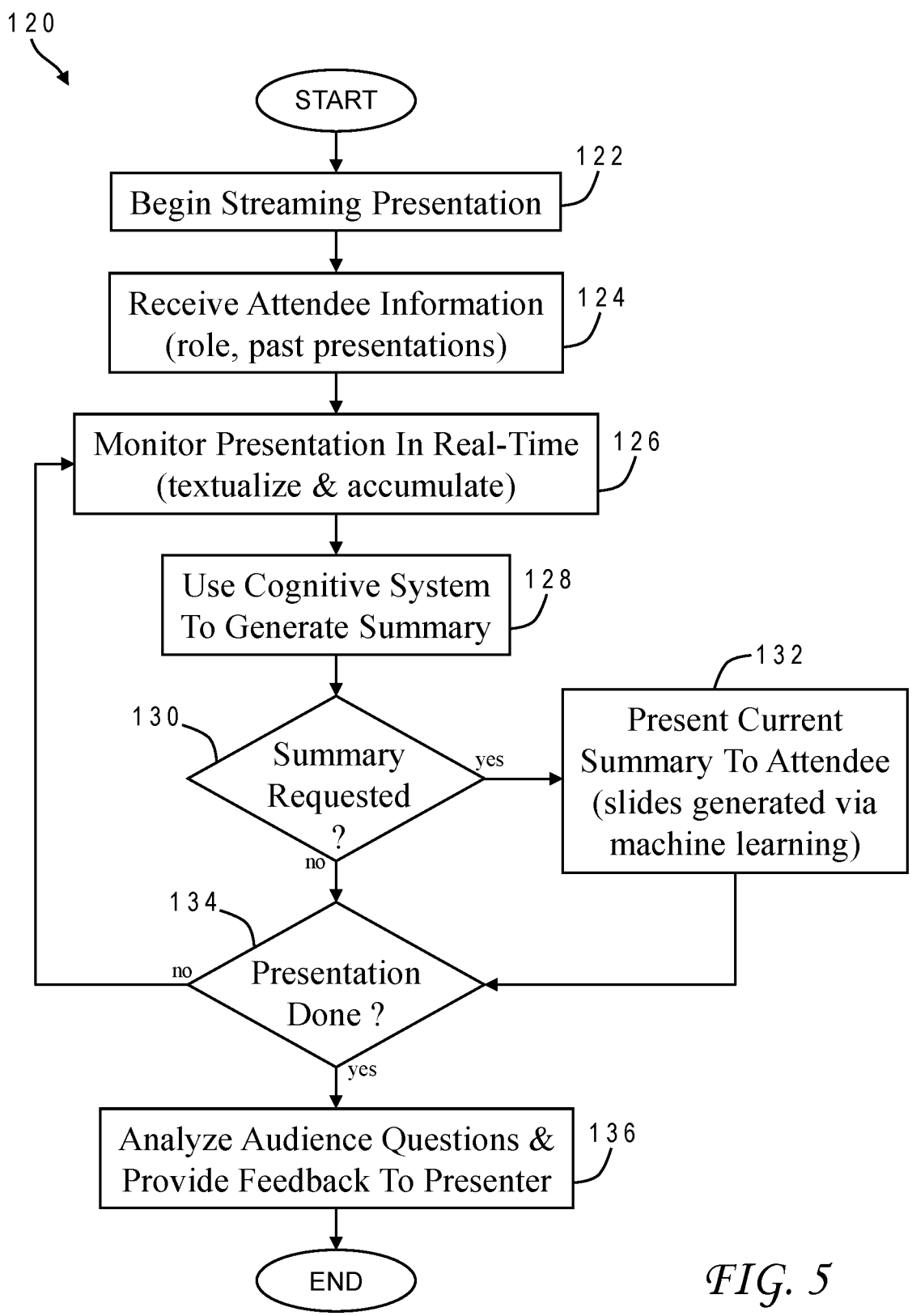
FIG. 5 is a chart illustrating the logical flow for a collaborative experience wherein an attendee can view a real-time summary of a presentation as the presentation is ongoing in accordance with one implementation of the present invention.

The present invention may be further understood with reference to the chart of FIG. 5 which illustrates the logical flow for a collaboration process 120 in accordance with one implementation. Process 120 starts with the beginning of a new online presentation 122, i.e., via video and audio streaming using collaborative software. Those involved with the presentation include one or more presenters and one or more attendees (a person could be considered a presenter and an attendee), at least some of whom are at different physical locations and communicating over a network such as the Internet. In order to customize the summarization function for a particular attendee, a cognitive system in the cloud receives information for that attendee 124. The information can include data pertaining to past presentations the attendee has participated in, as described above. The information can further include some identification of the type of role this attendee has in the organization. The attendee can manually designate a role through a setting provided in the software's user interface, or the system can automatically extract the role in various ways, such as identifying a role from an employee directory, blue pages, or similar personnel indices, or through more complicated means such as data mining using social networks and cognitive analysis. Roles can have varying granularity. As noted above, they could refer to more general roles such as sales versus technical, but finer distinctions could be made, for example within technical designation a person could still have varying roles such as programmer, analyst, system supervisor, etc. If no role information is provided, a default role can be used that balances different perspectives.

Process 120 then continues with system monitoring of the presentation in real-time 126. The monitoring includes textualization of any non-text media, and accumulates the resulting text content for analysis. A cognitive system provides that analysis to generate the text summary 128. The cognitive system can tailor the summary according to the information provided for the particular attendee, e.g., omitting material that is outside of the attendee's role or was already covered in a previous presentation seen by the attendee. If the user requests a summary 130, the cognitive system feeds the text summary to the collaborative user interface for the attendee 132, preferably in the form of a mini-presentation having a short series of text slides. The process continues iteratively at the monitoring 126 until the presentation is complete 134. In the exemplary implementation the summary is generated periodically, such as every five minutes, regardless of whether it is ever requested. Alternatively, the summary can be generated on-demand. Once the presentation is over, another cognitive system can be used to analyze audience questions and provide feedback to the presenter 136, as described above.

The present invention in its various embodiments thereby provides a superior collaborative experience. That experience can be customized to individual users not only based on role or background knowledge, but also on any other pertinent relationships. Attendees no longer need to be concerned about how they are going to catch up on meeting content that they missed, or worry about being blindsided by a question they might otherwise be unprepared for. The cognitive summary can be provided in a very-user friendly form, particularly from such helpful features as keyword searching and the smart scrollbar which allow instant review of previous meeting content.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the real-time summary as described herein is text only for simplicity but the present invention is not so limited. The summary could still have other types of media such as graphics, images or audio clips (e.g., a salient oral comment from the presenter given during a topic). It is therefore contemplated that such modifications can be made without departing from the spirit or scope of the present invention as defined in the appended claims.

What is claimed is:

1. A method of enhancing an online meeting between at least one presenter and at least one attendee who is remote from the at least one presenter comprising:
   accumulating meeting content provided by the at least one presenter to the at least one attendee over a network;
   analyzing the accumulated meeting content in real-time during the online meeting using a cognitive system to create a summary of the meeting content wherein the cognitive system is trained using previous presentations provided to an attendee of the at least one attendee and using a plurality of candidate roles and the summary is customized to the attendee by the cognitive system based on information in the accumulated meeting content which is also found in one or more of the previous presentations and based on a role of the attendee;
   receiving a request from the attendee to review the summary; and
   responsive to the received request, providing the summary to the attendee over the network while the online meeting is ongoing.

2. The method of claim 1 wherein:
   the meeting content is textualized; and the summary includes a plurality of electronic slides each having text generated by the cognitive system relating to a respective topic.

3. The method of claim 1 wherein:

the summary is divided into a plurality of topics;

the accumulated meeting content is presented to the attendee in a presentation window of a collaborative meeting user interface having a scrollbar divided into multiple sections respectively corresponding to the plurality of topics; and the presentation window switches from display of current content to display of previous content in response to a selection by the attendee of a particular one of the sections of the scrollbar.

4. The method of claim 1 further comprising:

collecting information pertaining to audience interaction with the at least one presenter during the online meeting;

analyzing the information to identify at least one subject of the audience interaction that is also a topic of the meeting content; and informing at least one the presenter of the at least one subject.

5. A computer system comprising:

one or more processors which process program instructions;

a memory device connected to said one or more processors; and program instructions residing in said memory device for enhancing an online meeting between at least one presenter and at least one attendee who is remote from the at least one presenter by accumulating meeting content provided by the at least one presenter to the at least one attendee over a network, analyzing the accumulated meeting content in real-time during the online meeting using a cognitive system to create a summary of the meeting content wherein the cognitive system is trained using previous presentations provided to an attendee of the at least one attendee and using a plurality of candidate roles and the summary is customized to the attendee by the cognitive system based on information in the accumulated meeting content which is also found in one or more of the previous presentations and based on a role of the attendee, receiving a request from the attendee to review the summary, and responsively providing the summary to the attendee over the network while the online meeting is ongoing.

6. The computer system of claim 5 wherein:

the meeting content is textualized; and the summary includes a plurality of electronic slides each having text generated by the cognitive system relating to a respective topic.

7. The computer system of claim 5 wherein:

the summary is divided into a plurality of topics;

the accumulated meeting content is presented to the attendee in a presentation window of a collaborative meeting user interface having a scrollbar divided into multiple sections respectively corresponding to the plurality of topics; and the presentation window switches from display of current content to display of previous content in response to a selection by the attendee of a particular one of the sections of the scrollbar.

8. The computer system of claim 5 further comprising:

collecting information pertaining to audience interaction with the at least one presenter during the online meeting;

analyzing the information to identify at least one subject of the audience interaction that is also a topic of the meeting content; and informing the at least one presenter of the at least one subject.

9. A computer program product comprising:

one or more computer readable storage media; and program instructions collectively residing in said one or more computer readable storage media for enhancing an online meeting between at least one presenter and at least one attendee who is remote from the at least one presenter by accumulating meeting content provided by the at least one presenter to the at least one attendee over a network, analyzing the accumulated meeting content in real-time during the online meeting using a cognitive system to create a summary of the meeting content wherein the cognitive system is trained using previous presentations provided to an attendee of the at least one attendee and using a plurality of candidate roles and the summary is customized to the attendee by the cognitive system based on information in the accumulated meeting content which is also found in one or more of the previous presentations and based on a role of the attendee, receiving a request from the attendee to review the summary, and responsively providing the summary to the attendee over the network while the online meeting is ongoing.

10. The computer program product of claim 9 wherein:

the meeting content is textualized; and the summary includes a plurality of electronic slides each having text generated by the cognitive system relating to a respective topic.

11. The computer program product of claim 9 wherein:

the summary is divided into a plurality of topics;

the accumulated meeting content is presented to the attendee in a presentation window of a collaborative meeting user interface having a scrollbar divided into multiple sections respectively corresponding to the plurality of topics; and the presentation window switches from display of current content to display of previous content in response to a selection by the attendee of a particular one of the sections of the scrollbar.

12. The computer program product of claim 9 further comprising:

collecting information pertaining to audience interaction with the at least one presenter during the online meeting;

analyzing the information to identify at least one subject of the audience interaction that is also a topic of the meeting content; and informing the at least one presenter of the at least one subject.

\* \* \* \* \*